No. 632,460. Patented Sept. 5, 1899.
T. A. HEARSON & W. T. SHAW.
BACK PEDALING BRAKE.
(Application filed Aug. 6, 1897.)
(No Model.) 5 Sheets—Sheet 1.
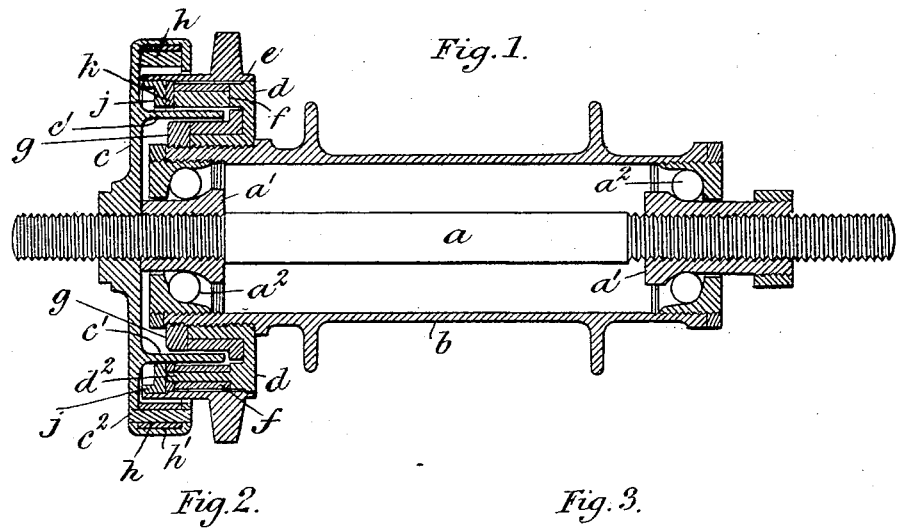

No. 632,460. Patented Sept. 5, 1899.
T. A. HEARSON & W. T. SHAW.
BACK PEDALING BRAKE.
(Application filed Aug. 6, 1897.)
(No Model.) 5 Sheets—Sheet 2.
Fig. 6.
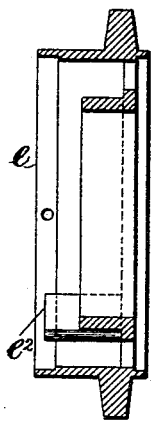
Fig. 7.
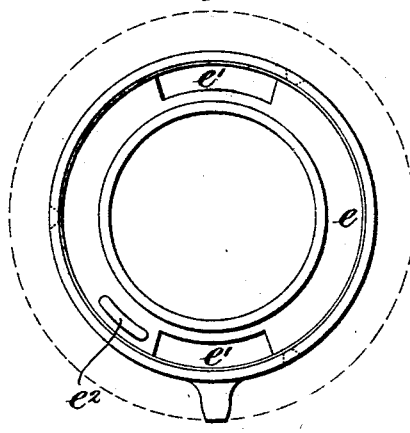
Fig. 8.
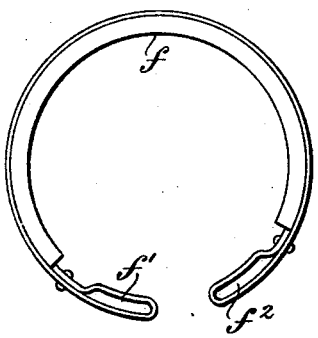
Fig. 9. Fig. 10.
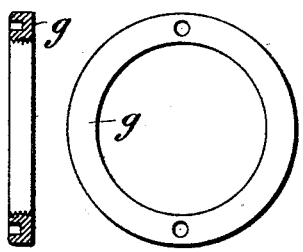
Fig. 11.
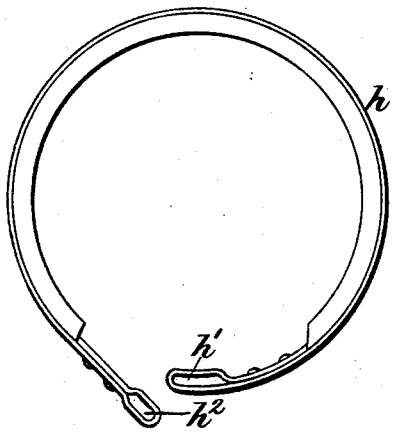
Fig. 12. Fig. 13.
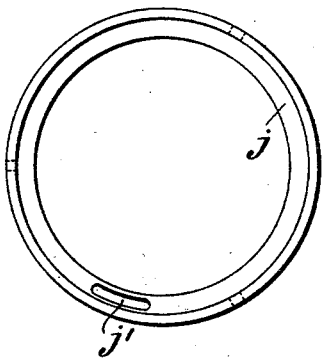
Fig. 14. Fig. 15.
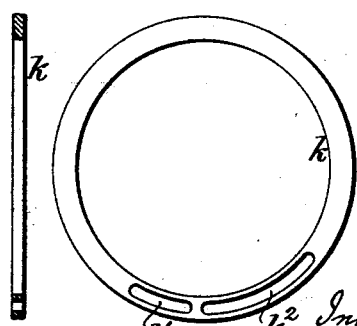
Witnesses.
E. A. Balloch
Edmund A. Krause
Inventors
Thomas Alfred Hearson
William Thomas Shaw
By their Attorneys
Paulson Davidson & Wight No. 632,460. Patented Sept. 5, 1899.
T. A. HEARSON & W. T. SHAW.
BACK PEDALING BRAKE.
(Application filed Aug. 6, 1897.)

(No Model.) 5 Sheets—Sheet 3.

Witnesses.
E. A. Ballock
Edmund H. Shaw

Inventors
Thomas Alfred Hearson
William Thomas Shaw
By their Attorneys,
Baldwin Davidson Wight.

THE NORRIS PETERS CO., PHOTO-LITHO., WASHINGTON, D. C.

No. 632,460. Patented Sept. 5, 1899.
T. A. HEARSON & W. T. SHAW.
BACK PEDALING BRAKE.
(Application filed Aug. 6, 1897.)
(No Model.) 5 Sheets—Sheet 4.
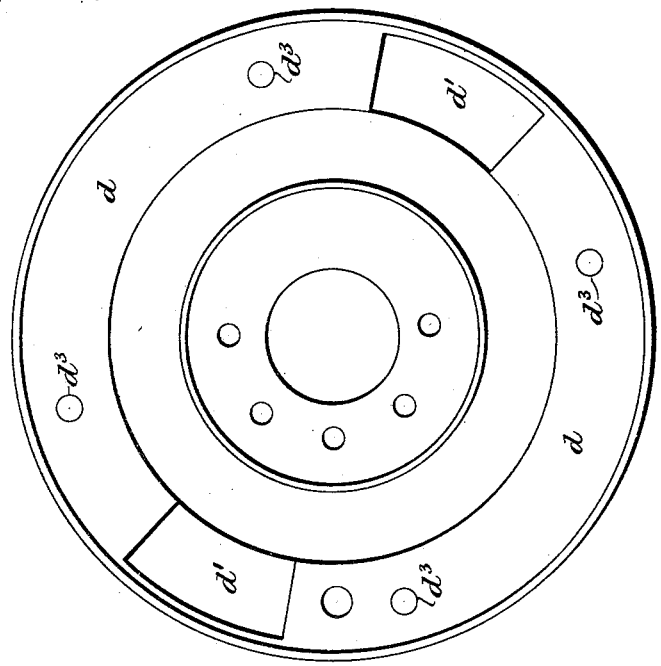
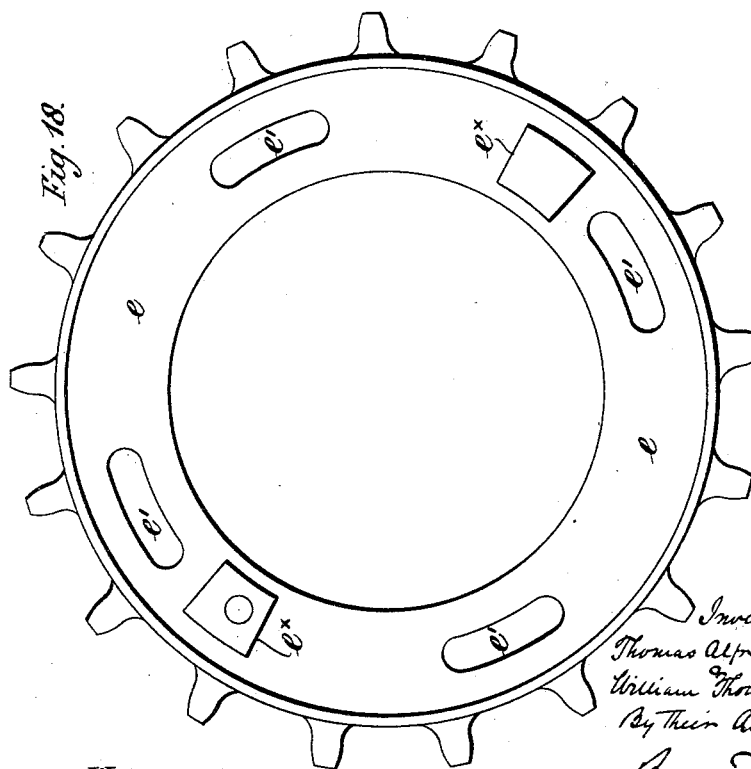
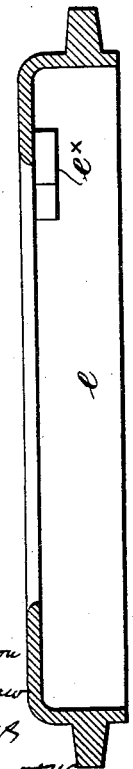

No. 632,460. Patented Sept. 5, 1899.
T. A. HEARSON & W. T. SHAW.
BACK PEDALING BRAKE.
(Application filed Aug. 6, 1897.)
(No Model.) 5 Sheets—Sheet 5.

UNITED STATES PATENT OFFICE.

THOMAS ALFRED HEARSON AND WILLIAM THOMAS SHAW, OF LONDON, ENGLAND, ASSIGNORS, BY DIRECT AND MESNE ASSIGNMENTS, TO THE AUTOMATIC BRAKE SYNDICATE, (GARDNER'S PATENTS,) LIMITED, OF SAME PLACE.

BACK-PEDALING BRAKE.

SPECIFICATION forming part of Letters Patent No. 632,460, dated September 5, 1899.

Application filed August 6, 1897. Serial No. 647,355. (No model.)

*To all whom it may concern:*

Be it known that we, THOMAS ALFRED HEARSON, professor of engineering, residing at Cooper's Hill, Englefield Green, London, in the county of Surrey, and WILLIAM THOMAS SHAW, gentleman, residing at Hypatia Lodge, Campden Hill, Kensington, London, in the county of Middlesex, England, subjects of the Queen of Great Britain, have invented certain new and useful Brakes Suitable for Velocipedes, of which the following is a specification.

This invention has been patented to me in Great Britain, No. 15,763, dated July 16, 1896.

This invention relates to brakes which are applied by the action of back-pedaling; and it has for its object to combine with such mechanism a subsidiary brake or retarding apparatus which can be applied at will to the pedal-axle or such other portion of the mechanism which if the feet were on the treadles would be retarded by the action of back-pedaling and can thus bring into operation by a method alternative to back-pedaling the same main brake.

Figure 23:
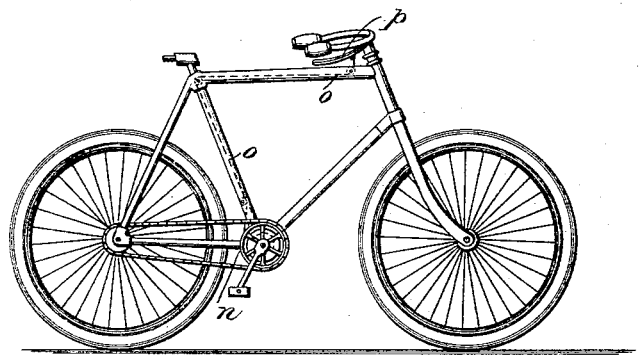
Figure 24:
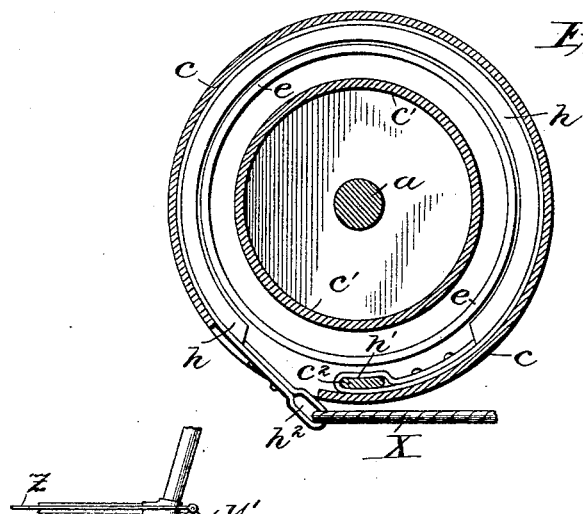
Figure 25:
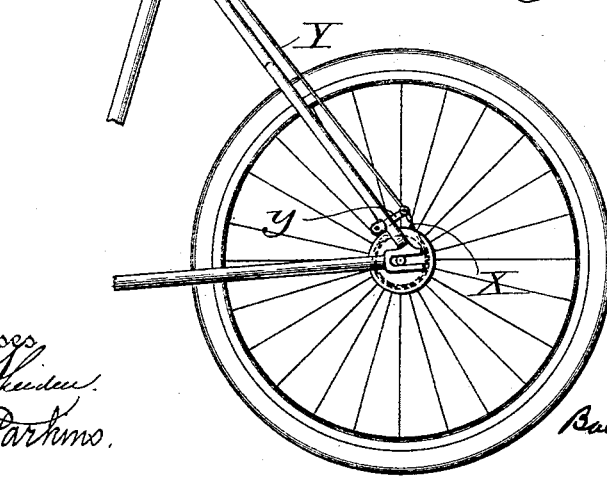

Figure 1 is a central longitudinal section showing the mechanism applied to the rear axle of a velocipede. Figs. 2 to 15 are detached views of the parts. Figs. 16 to 22 show a modification in which the apparatus is applied to the pedal-axle, Fig. 16 being a vertical section on the line 16 16, Fig. 17, which is a central longitudinal section. Figs. 18 to 22 are detached views of the parts. Fig. 23 is a side elevation, to a reduced scale, of a bicycle provided with this brake; Fig. 24, a cross-section through Fig. 1, showing the parts $c\ c$ and the brake-strap $h$; Fig. 25, a view showing a part of the machine wherein the brake-strap $h$ on the hub of the rear wheel may be operated from the handle-bar.

In Figs. 1 to 15, $a$ is the axle, fixed to the frame of the machine and having on it cones $a'$, forming bearings for the balls $a^2$, on which the hub $b$ of the wheel runs. $c$ is a disk (shown separately at Figs. 2 and 3) which is fixed to the axle $a$, and $c'$ is a drum made in one piece with it. $d$ is a disk (shown separately at Figs. 4 and 5) fixed to a sleeve screwed onto the hub $b$ and having fixed to it two lugs $d'$, one of which carries a projection $d^2$. $e$ is the chain-wheel (shown separately at Figs. 6 and 7,) having in it two slots $e'$ to receive the lugs $d'$ and provided with a collar $e^2$, engaging with the loop $f'$ at one end of the brake-strap $f$, Fig. 8, the other end of which carries a loop $f^2$, fitting over the projection $d^2$. $g$, Figs. 9 and 10, is a lock-nut holding the chain-wheel $e$ and disk $d$ in place. $h$, Fig. 11, is a second or subsidiary brake-strap encircling a drum made in one piece with the chain-wheel $e$, Figs. 6 and 7, and having one end $h'$ fixed to the disk $c$, Figs. 2 and 3, (and therefore to the frame of the machine,) by the cotter $c^2$, while the other end $h^2$ is connected by a cord or otherwise to mechanism which may be operated by the hand or otherwise. A ring $j$, Figs. 12 and 13, is provided, which fits into the inside of the wheel $e$ and has in it a recess $j'$ to receive and support the end of the cotter $e^2$. $k$, Figs. 14 and 15, is a washer having in it slots $k'\ k^2$, through which the cotter $e^2$ and projection $d^2$ on the disk $d$, Figs. 4 and 5, respectively pass.

Under ordinary circumstances when the brake-strap $h$ is slack, then, since the chain-wheel $e$ tends to revolve faster than the disk being driven by the chain, while the disk is retarded by the friction of the ground on the carrying-wheel, it follows that the top lug $d'$, Fig. 5, comes against the left-hand end of the top slot $e'$, Fig. 7, and the bottom lug $d'$ against the right-hand end of the bottom slot $e'$, and the brake-strap $f$ is therefore also slackened. If, however, the chain-wheel $e$ is retarded, either by back-pedaling or by tightening the strap $h$, then the lugs $d'$ move to the other ends of the slots $e'$ and tighten the strap $f$ on the drum $c'$, Fig. 2, and thus diminish the speed of the machine.

Figure 16:
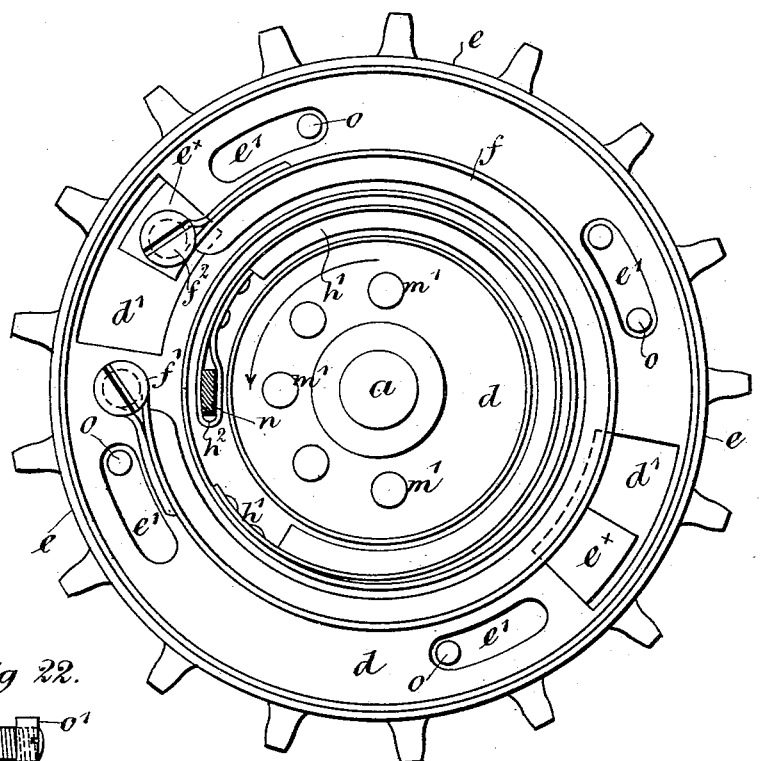
Figure 22:
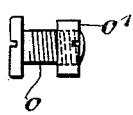

Figs. 16 to 22 show a similar arrangement applied to the front chain-wheel. Fig. 16 is a section on the line 16 16, Fig. 17, the latter being a central longitudinal section. In this case the axle $a$ is the pedal-axle and revolves in bearings fixed to the frame $l$ of the machine. The disk $c$ and drum $c'$ are attached by rivets $l'$ to the frame $l$. The disk $d$, Figs. 20 and 21, is attached by rivets $m'$ to the pedal-crank $m$, and it has in it slots $d'$ to receive the lugs $e^\times$ on the chain-wheel $e$, Figs. 18 and 19. The brake-strap $f$ has one end fixed by a screw $f'$ to the disk $d$ and the other by a screw $f^2$ to one of the lugs $e^\times$ on the wheel $e$. The subsidiary brake-strap $h$ has one end $h'$ fixed to the inside of the drum $c'$ and the other end $h^2$ to one end of the lever $n$, pivoted at $n'$ and operated by the hand or otherwise. In Fig. 23 it is shown connected by the cord $o$ to the lever $p$ on the handle-bar. The chain-wheel $e$ is kept close in position against the disk $d$ by the screws $o$, Fig. 22, whose stems pass through slots $e'$ in the wheel, are screwed through holes $d^3$ in the disk, and are secured on the other side of it by lock-nuts $o'$. The action of this arrangement is exactly the same as that last described.

As will be seen from Fig. 24, the end of the brake-strap $h$ may be brought out of a slot in the peripheral flange of the part $c$ and connected with a cord or chain X.

As seen in Fig. 25, the cord or chain X may be connected with a wire or rod Y, which may, if desired, be mounted in a pivoted link $y$, adjacent to the hub, and also to a pivoted link $y'$, adjacent to the vertical bar of the frame which carries the saddle. This pivoted link $y'$ may be V-shaped or is in effect a bell-crank lever, and to its other point or arm is connected a wire or rod Z, which may run forward parallel with the horizontal frame-bar and be actuated in any suitable manner from the handle-bars by the rider. In this manner the rider may at will throw into action the brake when it is applied to the rear wheel of the machine.

Figure 17:
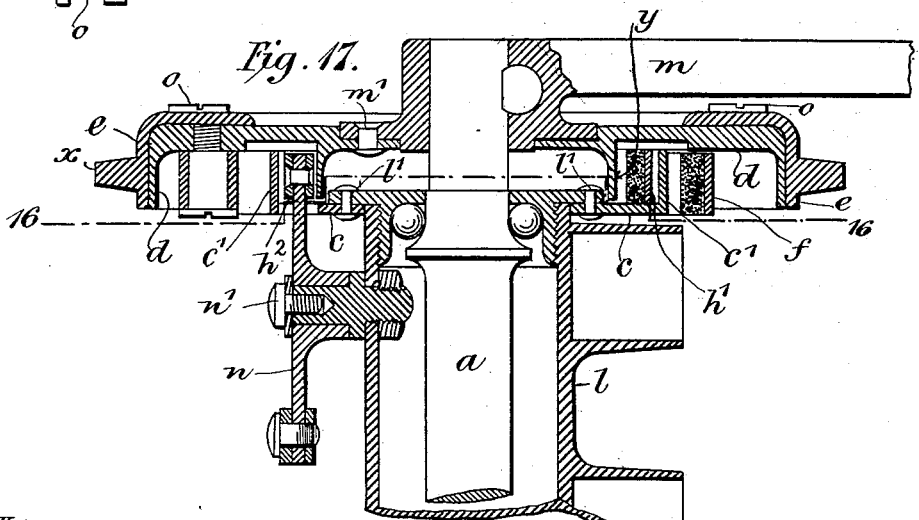

In this brake there is a first part—viz., the wheel $e$ of Fig. 1 or the disk $d$ of Fig. 17—which is driven directly or indirectly through a chain by the pedal. Such first part, through the medium of lugs and slots, engages a second part, and the two of course normally revolve together at the same speed. The brake-strap has its ends fixed to these two parts, respectively, and surrounds a fixed drum. Consequently when the pedal-driven part—i. e., the first part—is retarded the brake is applied.

What we claim is—

1. The combination with a brake normally operated by back-pedaling, of a subsidiary brake for retarding the portion of the mechanism which, for the purpose of applying the brake, is normally retarded by back-pedaling.

2. The combination of a wheel, a brake normally rotating with the wheel operated by back-pedaling, a fixed drum or surface acted on by the brake, a drum or surface rotating with the brake and a subsidiary brake acting on the latter drum or surface.

3. The combination of a fixed axle, a hub free to turn on the axle, a sleeve fixed to the hub, a disk fixed to the sleeve, a chain-wheel free to turn on the sleeve, lugs engaging with slots and connecting the disk and chain-wheel, a disk fixed to the axle, a drum fixed to the disk, a brake-strap on this drum and having one end fixed to the first disk and the other to the chain-wheel, and a second brake-strap acting on the chain-wheel and having one end fixed to the second disk and the other being acted on by the rider.

THOMAS ALFRED HEARSON.
WILLIAM THOMAS SHAW.

Witnesses:
FRED C. HARRIS,
ROBERT B. RANSFORD.